United States Patent
Penning et al.

(10) Patent No.: US 6,417,255 B1
(45) Date of Patent: Jul. 9, 2002

(54) HIGH PERFORMANCE THERMOPLASTIC COMPOSITIONS WITH IMPROVED MELT FLOW BEHAVIOR

(75) Inventors: Jan Paul Penning; Robert Puyenbroek; Geert-Jan Willems, all of Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/461,988

(22) Filed: Dec. 15, 1999

(51) Int. Cl.[7] .................. C08K 5/1539; C08K 5/5398
(52) U.S. Cl. ........................................ 524/112; 524/154
(58) Field of Search ............................. 524/112, 109, 524/154, 912; 525/436

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,123,494 A | 3/1964 | Charreau |
| 3,625,999 A * | 12/1971 | Priestley .................. 524/154 |
| 3,803,085 A | 4/1974 | Takeoshi et al. |
| 3,814,869 A | 6/1974 | De Luca |
| 3,847,867 A | 11/1974 | Health et al. |
| 3,850,885 A | 11/1974 | Scotia et al. |
| 3,852,242 A | 12/1974 | White |
| 3,855,178 A | 12/1974 | White et al. |
| 3,905,942 A | 9/1975 | Takekoshi et al. |
| 3,972,902 A | 8/1976 | Health et al. |
| 3,983,093 A | 9/1976 | Williams, III et al. |
| 4,038,258 A * | 7/1977 | Singh et al. .............. 524/154 |
| 4,042,551 A | 8/1977 | Kruse |
| 4,058,505 A * | 11/1977 | D'Alelio .................. 525/436 |
| 4,076,929 A | 2/1978 | Dohany |
| 4,135,009 A | 1/1979 | Mercurio |
| 4,151,151 A | 4/1979 | Isley |
| 4,310,654 A | 1/1982 | Carnahan, Jr. |
| 4,443,591 A | 4/1984 | Schmidt et al. |
| 4,455,410 A | 6/1984 | Giles, Jr. |
| 4,481,325 A | 11/1984 | Giles, Jr. |
| 4,515,921 A | 5/1985 | Witman |
| 4,515,924 A | 5/1985 | Brooks et al. |
| 4,588,806 A | 5/1986 | Aycock et al. |
| 4,663,378 A | 5/1987 | Allen |
| 4,747,546 A | 5/1988 | Talacko |
| 4,778,855 A | 10/1988 | Boutini et al. |
| 4,814,366 A * | 3/1989 | Hirahara et al. ............ 524/112 |
| 4,822,830 A | 4/1989 | Adkins |
| 4,874,803 A * | 10/1989 | Baron et al. ................. 524/100 |
| 4,943,380 A * | 7/1990 | Sugiura et al. ............. 524/154 |
| 4,959,454 A | 9/1990 | Fukuyama |
| 5,021,473 A * | 6/1991 | Macholdt et al. .......... 524/154 |
| 5,081,185 A | 1/1992 | Haaf et al. |
| 5,087,666 A * | 2/1992 | Yu et al. ..................... 524/112 |
| 5,177,149 A | 1/1993 | Angeli et al. |
| 5,214,083 A * | 5/1993 | Kodaira et al. ............. 524/112 |
| 5,229,482 A | 7/1993 | Brunelle |
| 5,272,248 A | 12/1993 | Pratt et al. |
| 5,376,714 A | 12/1994 | Yates |
| 5,376,724 A | 12/1994 | Bailly et al. |
| 5,380,805 A * | 1/1995 | Tamai et al. ................ 525/436 |
| 5,449,709 A * | 9/1995 | Imae et al. .................. 524/154 |
| 5,668,202 A * | 9/1997 | Hirata et al. ................ 524/154 |
| 5,760,809 A * | 6/1998 | Mulhotra et al. ........... 428/704 |
| 5,830,974 A | 11/1998 | Schmidhauser et al. |
| 5,879,813 A * | 3/1999 | Tanaka et al. .............. 524/154 |
| 6,103,856 A * | 8/2000 | Funakoshi et al. .......... 528/198 |
| 6,117,950 A * | 9/2000 | Yamao et al. ............... 525/423 |
| 6,124,386 A * | 9/2000 | Yokota et al. .............. 524/154 |
| 6,154,201 A | 11/2000 | Levin et al. |
| 6,156,400 A * | 12/2000 | Jing et al. ................... 428/35.7 |
| 6,228,915 B1 * | 5/2001 | Lensvelt et al. ............ 524/154 |
| 6,281,286 B1 * | 8/2001 | Chorvath et al. |

FOREIGN PATENT DOCUMENTS

| | | |
|---|---|---|
| EP | 0 447 668 A | 12/1990 |
| JP | 1014267 | 1/1989 |
| JP | 7304942 | 11/1995 |
| WO | WO 99/61523 | 12/1999 |
| WO | WO 00/63283 | 10/2000 |

* cited by examiner

Primary Examiner—Peter Szekely

(57) ABSTRACT

The present invention is a high performance thermoplastic polymer composition that comprises a thermoplastic polymer resin such as polyetherimide, polyethersulfone, etc., and an additive formulated to improve the overall melt flow properties of the final composition. The additive can be a phosphonium sulfonate or an anhydride. The final composition has improved melt flow qualities with no significant depreciation in other desirable characteristics.

10 Claims, No Drawings

HIGH PERFORMANCE THERMOPLASTIC COMPOSITIONS WITH IMPROVED MELT FLOW BEHAVIOR

BACKGROUND OF THE INVENTION

High performance thermoplastic polymers, such as polyetherimides and polyethersulfones have been used to fabricate parts for numerous applications. Each application requires particular tensile and flexural properties, impact strength, heat distortion temperature, and resistance to warp. For example, U.S. Pat. No. 4,455,410 provides a polyetherimide-polyphenylenesulfide blend having good flexural strength characteristics. U.S. Pat. No. 3,983,093 provides polyetherimide compositions having improved solvent resistance and suitable for use in preparing films, molding compounds, coatings, and the like.

These thermoplastic polymers are characterized by a high glass transition temperature, typically above 150° C., which makes them suitable for use in applications that require exposure to high temperatures. A drawback of these materials is that they exhibit poor melt flow properties, which makes processing difficult. Injection molding of thermoplastic polymers, for instance, is more easily performed with a thermoplastic resin that has a higher melt volume rate. A good melt flow behavior is necessary to achieve fast molding cycles and to permit molding of complex parts. At the same time, mechanical properties such as impact/ductility must be maintained in order to pass product specifications.

What is needed in the art is thermoplastic polymers that have improved melt flow behavior without the consequent loss of other desirable characteristics in the finished product.

BRIEF SUMMARY OF THE INVENTION

The present invention overcomes the limitations of the prior art by incorporating additives into thermoplastic polymer resins. In one embodiment, this invention comprises a thermoplastic resin composition comprising a mixture, based on the total weight of the thermoplastic resin composition, of about 88 wt % to about 99 wt % pbw of a thermoplastic polymer resin; and, about 1 wt % to about 12 wt % of an additive selected from the group consisting of phosphonium sulfonate, anhydride, and combinations thereof.

DETAILED DESCRIPTION OF THE INVENTION

It has been found that (aromatic) phosphonium sulfonates as well as (aromatic) anhydride compounds provide highly improved melt flow properties to high performance thermoplastic polymers such as polycarbonates, polyimides (e.g. polyetherimides, polyamideimides, etc.), amorphous polyamides, polysulfones (e.g. polyethersulfones, polyarylsulfones, polyphenylsulfones (PPSU), etc.), poly ketones (e.g. poly(ether ketone), poly(ether ether ketone), etc.), polyphenylene sulfoxide, and poly(phenylene sulfoxide) (PPSO$_2$), mixtures thereof, and the like and other high performance thermoplastic resins, without causing detrimental effects on other physical properties, such as mechanical and impact properties.

The high performance thermoplastic polymer of the present invention comprises a thermoplastic polymer preferably having a glass transition temperature exceeding about 150° C., preferably exceeding about 170° C., such as polycarbonates, polyimides (e.g. polyetherimides, polyamideimides, etc.), amorphous polyamides, polysulfones (e.g. polyethersulfones, polyarylsulfones, polyphenylsulfones (PPSU), etc.), poly ketones (e.g. poly(ether ketone), poly(ether ether ketone), etc.), polyphenylene sulfoxide, poly(phenylene sulfoxide) (PPSO$_2$), mixtures thereof, and the like; and an anhydride or a phosphonium sulfonate. Other additives are optionally added to the high performance thermoplastic polymer to improve other desirable characteristics.

Polyamide

The polyamide resins useful in the practice of the present invention are a generic family of resins known as amorphous polyamides or amorphous nylons, characterized by the presence of an amide group (—C(O)NH—). Nylon-6 and nylon-6,6 containing aromatic substituents, e.g., phthalamide residues, are the generally preferred amorphous polyamides and are available from a variety of commercial sources. Useful amorphous polyamides, include, for example, nylon-4,6T, nylon-12T, nylon-6,10T, nylon 6,9T, nylon 6/6T and nylon 6,6/6T although other amorphous nylons may be employed. Mixtures of various amorphous polyamides, as well as various amorphous polyamide copolymers, are also useful. The most preferred amorphous polyamide for the blends of the present invention is an amorphous polyamide-6,6 containing isophthalamide residues.

The polyamides can be obtained by a number of well known processes such as those described in U.S. Pat. Nos. 2,071,250, 2,071,251, 2,130,523, 2,130,948, 2,241,322, 2,312,966, 2,512,606, 5,177,149 (which are hereby incorporated by reference), and others. Nylon-6,6T is a condensation product of adipic acid, phthalic acid(s) and 1,6-diaminohexane. Likewise, nylon 4,6T is a condensation product between adipic acid, phthalic acid(s) and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

Amorphous polyamides having viscosity of up to and even exceeding about 400 ml/g can be used, with a viscosity of about 90 to about 350 ml/g preferred, and about 110 to about 240 ml/g especially preferred, as measured in a 0.5 wt % solution in 96 wt % sulphuric acid in accordance with ISO 307. Additionally, it is often preferred for the amorphous polyamide to have a very low amine endgroup level to avoid reactions with the anhydrides. Alternatively, the phosphonium sulfonate may preferably be used when the amorphous polyamide contains more than about 5% amine endgroups.

Thermoplastic Polyimides and Polyetherimides

Useful thermoplastic polyimides have the general formula (I)

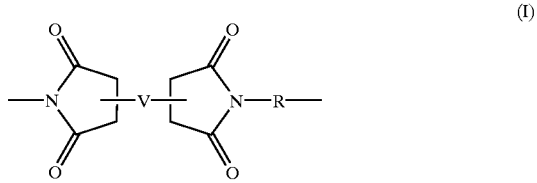

wherein V is a substituted or unsubstituted, divalent, trivalent, or tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having from 1 to about 30 carbon atoms; and combinations thereof. Suitable substitutions and/or linkers include, but are not limited to, ethers, epoxides, amides, esters, and combinations thereof.

R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having from about 3 to about 20 carbon atoms, or (d) divalent radicals of the general formula (II)

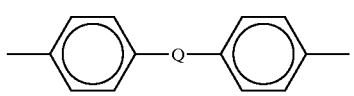
(II)

wherein Q includes but is not limited to divalent radicals of the formula (III)

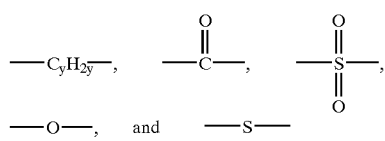
(III)

wherein y is an integer of from 1 to about 5; or combinations thereof.

Preferred classes of polyimides include polyamidimides and polyetherimides, particularly those polyetherimides known in the art which are melt processable, such as those whose preparation and properties are described in U.S. Pat. Nos. 3,803,085 and 3,905,942, each of which is incorporated herein by reference.

Preferred polyetherimide resins comprise more than 1, typically about 10 to about 1000 or more, and more preferably about 10 to about 500 structural units, of the formula (IV)

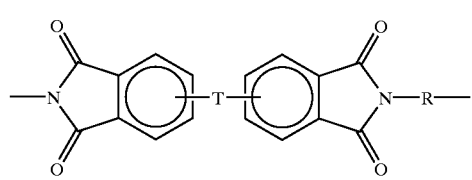
(IV)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (V).

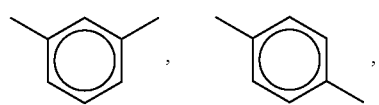
(V)

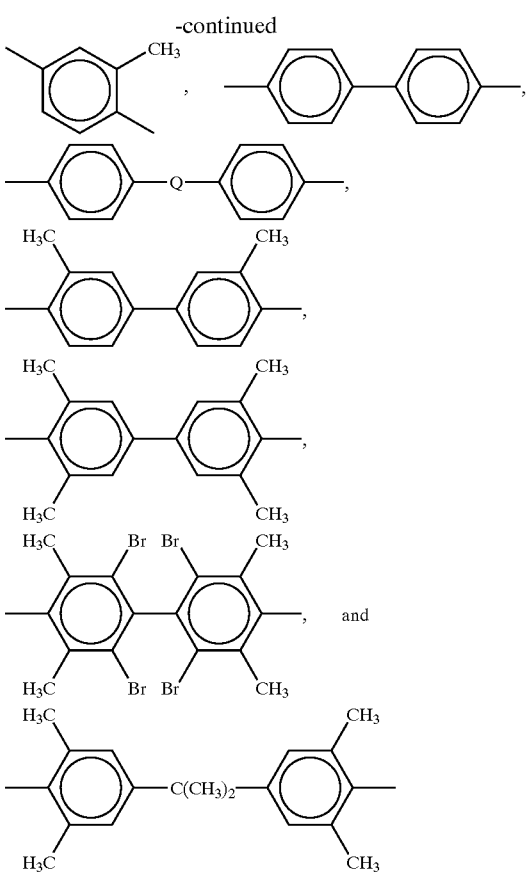

wherein Q includes but is not limited to divalent radicals of the formula (III)

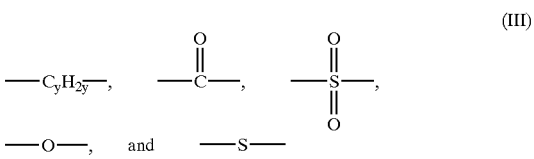
(III)

wherein y is an integer of from 1 to about 5; or combinations thereof.

In one embodiment, the polyetherimide may be a copolymer that, in addition to the etherimide units described above, further contains polyimide structural units of the formula (VI)

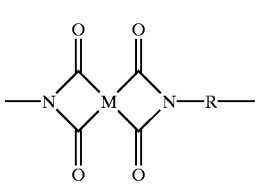
(VI)

wherein R is as previously defined for formula (I) and M includes, but is not limited to, radicals of formula (VII).

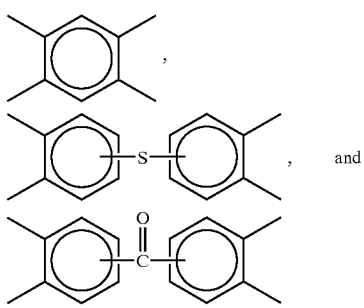

(VII)

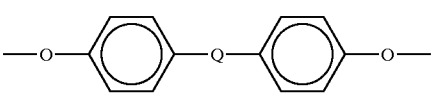

(X)

and the ether linkages, for example, are preferably in the 3,3', 3,4', 4,3', or 4,4' positions, and mixtures thereof, and where Q is as defined above.

Suitable organic diamines of formula (IX) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; isomeric methyl4,6-diethyl-1,3-phenylenediamines; bis(2-chloro-4-amino-3,5-diethylphenyl)methane; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

The polyetherimide can be prepared by any of the methods well known to those skilled in the art, including the reaction of an aromatic bis(ether anhydride) of the formula (VIII)

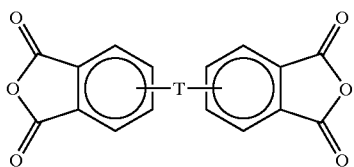

(VIII)

with an organic diamine of the formula (IX)

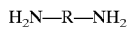

H₂N—R—NH₂ (IX)

wherein T and R are defined as described above in formulas (I) and (IV).

Examples of specific aromatic bis(ether anhydride)s and organic diamines are disclosed, for example, in U.S. Pat. Nos. 3,972,902 and 4,455,410, which are incorporated herein by reference. Illustrative examples of aromatic bis (ether anhydride)s of formula (VIII) include: 2,2-bis[4-(3,4-dicarboxyphenoxy)phenyl]propane dianhydride; 4,4'-bis (3,4-dicarboxyphenoxy)diphenyl ether dianhydride; 4,4'-bis (3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

In a particularly preferred embodiment, the polyetherimide resin comprises structural units according to formula (IV) wherein each R is independently paraphenylene or metaphenylene or a mixture thereof and T is a divalent radical of the formula (XI)

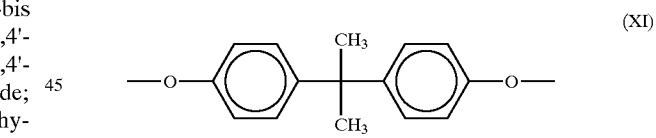

(XI)

Included among the many methods of making the polyimides, particularly polyetherimides, are those disclosed in U. S. Pat. Nos. 3,847,867, 3,814,869, 3,850,885, 3,852,242, 3,855,178, 3,983,093, and 4,443,591. These patents are incorporated herein by reference for the purpose of teaching, by way of illustration, general and specific methods for preparing polyimides.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (VIII) above includes, but is not limited to, compounds wherein T is of the formula (X)

In general, the reactions can be carried out employing well-known solvents, e.g., o-dichlorobenzene, m-cresol/toluene and the like to effect a reaction between the anhydride of formula (VIII) and the diamine of formula (IX), at temperatures of about 100° C. to about 250° C. Alternatively, the polyetherimide can be prepared by melt polymerization of aromatic bis(ether anhydride)s (VIII) and diamines (IX) by heating a mixture of the starting materials to elevated temperatures with concurrent stirring. Generally melt polymerizations employ temperatures of about 200° C. to about 400° C. Chain stoppers and branching agents may also be employed in the reaction. When polyetherimide/ polyimide copolymers are employed, a dianhydride, such as pyromellitic anhydride, is used in combination with the bis(ether anhydride). The polyetherimide resins can optionally be prepared from reaction of an aromatic bis(ether anhydride) with an organic diamine in which the diamine is present in the reaction mixture at no more than about 0.2 molar excess, and preferably less than about 0.2 molar excess. Under such conditions the polyetherimide resin has less than 15 microequivalents per gram ($\mu$eq/g) acid titratable groups, and preferably less than about 10 $\mu$eq/g acid titratable groups, as shown by titration with chloroform solution with a solution of 33 wt % hydrobromic acid in glacial acetic acid. Acid-titratable groups are essentially due to amine end-groups in the polyetherimide resin.

Generally, useful polyetherimides have a melt index of about 0.1 to about 10 grams per minute ("g/min"), as measured by American Society for Testing Materials ("ASTM") D1238 at 295° C., using a 6.6 kilogram ("kg") weight. In a preferred embodiment, the polyetherimide resin has a weight average molecular weight (Mw) of about 10,000 to about 150,000 grams per mole ("g/mole"), as measured by gel permeation chromatography, using a polystyrene standard. Such polyetherimide resins typically have an intrinsic viscosity [$\eta$] greater than about 0.2 deciliters per gram, preferably about 0.35 to about 0.7 deciliters per gram measured in m-cresol at 25° C. Some such polyetherimides include, but are not limited to Ultem 1000 (number average molecular weight (Mn) 21,000; weight average molecular weight (Mw) 54,000; dispersity 2.5), Ultem 1010 (Mn 19,000; Mw 47,000; dispersity 2.5), Ultem 1040 (Mn 12,000; Mw 34,000–35,000; dispersity 2.9), or mixtures thereof.

Poly(ether)sulfone

Polyethersulfone is a thermoplastic polymer having the general formula shown by Formula XII:

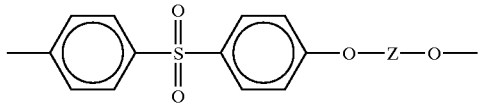

(XII)

where Z is a divalent radical according to Formula V. Some specific examples include:

wherein Z is of the formula:

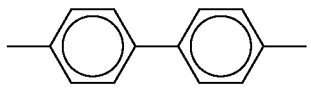

(XIII)

which corresponds to Polyphenylene sulfone such as Radel R by AMOCO, wherein Z is of the formula:

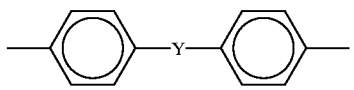

(XIV)

and Y is SO$_2$, which corresponds to polyethersulfone, such as Ultrason E commercially available from BASF Aktiengesellschaft, Ludwigshafen, Germany, or Y is C(CH$_3$)$_2$ which corresponds to Polysulfone such as Ultrason S commercially available from BASF, or Udel commercially available from BP AMOCO, Chicago, Ill.; and Z is a mixture of phenylene and diphenyl sulfone which corresponds to polyarylsulfone such as Radel A commercially available from AMOCO; as well as mixtures thereof, and others. In addition,

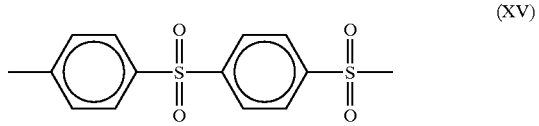

(XV)

corresponds to polyphenylenes ulfoxide, PPSO$_2$.

The polyethersulfone resins useful with the present invention include all those known in the art which are melt processible, such as those whose preparation and properties are described in U.S. Pat. Nos. 4,959,454, 4,310,654, 5,830, 974, 5,229,482, each of which is incorporated herein by reference, and others.

(Aromatic) Phosphonium Sulfonates

The phosphonium sulfonate compounds that improve the melt flow properties of the high performance thermoplastic resins have the basic structure as shown in formula (XVI):

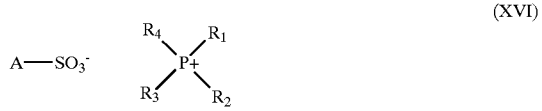

(XVI)

wherein A is an alkyl group with 1 to about 36 carbon atoms, alkenyl group with about 4 to about 24 carbon atoms, phenyl group, phenyl group substituted by alkyl group with 1 to about 18 carbon atoms, naphthyl group or naphthyl group substituted by alkyl group with 1 to about 18 carbon atoms, R$_1$, R$_2$ and R$_3$ are preferably identical, each being an aliphatic hydrocarbon group with 1 to about 8 carbon atoms or aromatic hydrocarbon group, and R$_4$ is a hydrocarbon group with 1 to about 18 carbon atoms.

A preferred phosphonium sulfonate is tetrabutylphosphonium dodecylbenzenesulfonate (EPA-202, available from Takemoto Oil & Fat Co.) (i.e., Formula XVI with A=p-dodecyl benzene and R$_1$=R$_2$=R$_3$=R$_4$=Butyl (—C$_4$H$_9$)). Others include tetrabutyl phosphonium benzene sulfonate (A=Benzene and R$_1$=R$_2$=R$_3$=R$_4$=Butyl), tetrabutyl phosphonium methane sulfonate (A=Methyl and R$_1$=R$_2$=R$_3$=R$_4$=Butyl), tetrabutyl phosphonium trifluoromethane sulfonate (A=TrifluoroMethane and R$_1$=R$_2$=R$_3$=R$_4$=Butyl), tetrabutyl phosphonium perfluorobutyl sulfonate (A=Perfluorobutane (CF$_3$CF$_2$CF$_2$CF$_2$—) and R$_1$=R$_2$=R$_3$=R$_4$=Butyl) or tetrabutyl phosphonium diphenylsulfon sulfonate (A=Diphenylsulfone and R$_1$=R$_2$=R$_3$=R$_4$=Butyl), (Aromatic) Anhydrides Aromatic anhydrides also improve the melt flow properties of the thermoplastic resins of this invention, and, in a preferred embodiment, have the basic structures shown in at least one of the formulas XVII:

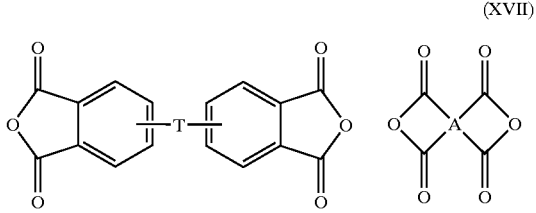

(XVII)

wherein the divalent T moiety bridges the 3,3', 3,4', 4,3', or 4,4' positions of the aryl rings of the respective aryl anhydride moieties of (XVII); T is —O—, —CO—, —SO$_2$—, —S—, —C$_y$H$_{2y}$ group, a group of the formula —O—Z—O—, and mixtures thereof, where Z is a divalent moiety that is predominantly aromatic in nature, such as those in Formulae V; A is a divalent aromatic radical such as 1,2,4,5-phenylene, 2,3,6,7-naphthalene, combinations thereof, and the like.

Some examples of possible anhydrides include: phthalic dianhydride, 4,4' oxy diphthalic anhydride, bisphenol A dianhydride, dimethyl siloxane dianhydride, benzophenone dianhydride, biphenyl dianhydride, diphenyl sulfone dianhydride, as well as aromatic bis(ether anhydride)s of Formula VIII, combinations thereof, and the like.

Other Additives

The thermoplastic resin composition of the present invention may optionally comprise various additives, such as antioxidants, for example, organophosphites, for example, tris(nonyl-phenyl)phosphite, tris(2,4-di-t-butylphenyl) phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis [methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3, 5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, titanium dioxide, fibers, glass fibers (including continuous and chopped fibers), carbon black, graphite, calcium carbonate, talc, mica and other additives such as, for example, mold release agents, UV absorbers, stabilizers such as light stabilizers and others, lubricants, plasticizers, pigments, dyes, colorants, anti-static agents, blowing agents, flame retardants, impact modifiers, among others, and combinations thereof.

The preparation of the compositions of the present invention is normally achieved by merely blending the ingredients under conditions suitable for the formation of an intimate blend. Such conditions often include solution blending or melt mixing in single or twin screw type extruders, mixing bowl, roll, kneader, or similar mixing device that can apply a shear to the components. Twin screw extruders are often preferred due to their more intensive mixing capability over single screw extruders. It is often advantageous to apply a vacuum to the blend through at least one vent port in the extruder to remove volatile components in the composition.

Meanwhile, the blend is preferably sufficiently heated such that the components are in the molten phase, thereby enabling intimate mixing. Typically temperatures up to about 360° C. can be employed, with about 220° C. to about 350° C. preferred, and about 260° C. to about 340° C. especially preferred.

The composition typically comprises, based upon the total weight of the composition, about 88 wt % to about 99 wt % of a thermoplastic polymer resin and about 1 wt % to about 12 wt % of an additive selected from the group consisting of phosphonium sulfonate, anhydride, and mixtures thereof, with about 93 wt % to about 99 wt % of the thermoplastic polymer(s) resin and about 1 wt % to about 7 wt % of the additive(s) preferred.

The composition of the present invention can be molded into useful articles, such as, for example, heat resistant containers, by a variety of techniques such as, for example, injection molding, compression molding, thermoforming, and blow molding, among others conventionally known in the art.

EXAMPLES

Example 1

A typical example of the claimed composition comprises 97.0 weight percent (wt %) of a polyetherimide resin having a weight-average molecular weight of 54,000 g/mol (Ultem® 1000-1000) and 3.0 wt % of tetrabutylphosphonium dodecylbenzene sulfonate (EPA-202 from Takemoto Oil & Fat Co.). A dry-mixture of polyetherimide resin and EPA-202 were fed into the throat of a 25 mm twin screw extruder operated at 300 rpm and 360° C. The resulting material was pelletized and dried. Mechanical properties were determined using ISO test bars, which are injection molded using a 130 ton Stork injection molding unit at melt temperature 360° C., injection pressure 80 bar, and mold temperature 160° C. Mechanical properties were determined according to ISO 527 and ISO 180 standards.

Melt volume rate (MVR) was determined according to ISO 1133 at 360° C./5kg (unless stated otherwise), using a Zwick capillary rheometer. Melt viscosity (MV) was determined at 360° C. using different shear rates in the range from 100 to 6000 s$^{-1}$ using a Goettfert capillary rheometer. Molecular weight distribution was determined by means of gel permeation chromatography (GPC) using chloroform as a solvent. It is seen that the composition of this Example exhibited a melt volume rate that was 57% higher (27.4 vs. 17.4 cubic centimeters per 10 minutes (cc/10 min)) as compared to the composition without tetrabutylphosphonium dodecylbenzene sulfonate, without any appreciable loss of molecular weight, tensile properties or impact strength.

Example 2

As in Example 1, with a composition comprising 98.5 wt % of Ultem® 1000-1000 and 1.5 wt % of tetrabutylphosphonium dodecylbenzene sulfonate.

Example 3

As in Example 1, with a composition comprising 20.0 wt % of a polyetherimide resin having a weight-average molecular weight of 54,000 g/mol (Ultem® 1000-1000), 77.0 wt % of a polyetherimide resin having a weight-average molecular weight 47,000 g/mol (Ultem® 1010-1000) and 3.0 wt % of tetrabutylphosphonium dodecylbenzene sulfonate. The composition of this Example exhibited a melt volume rate that was 30% higher (43.0 vs. 33.2 cc/10 min) as compared to the composition without tetrabutylphosphonium dodecylbenzene sulfonate (Reference 2), and a melt viscosity at 1500 s$^{-1}$ that is 28% lower (323 vs. 453 Pascal seconds (Pa·s)) as compared to the composition in Reference 2, without any appreciable loss of molecular weight, tensile properties, or impact strength.

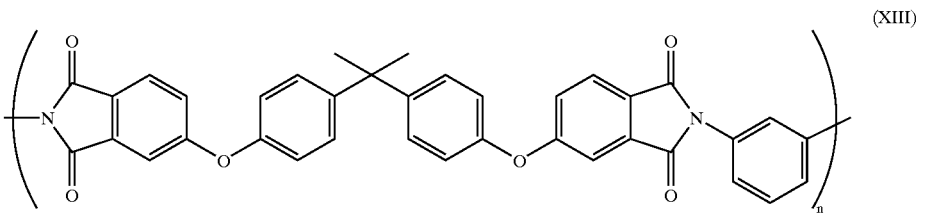

(XIII)

Example 4

As in Example 1, with a composition comprising 20.0 wt % of Ultem® 1000-1000, 78.5 wt % of Ultem® 1010-1000 and 1.5 wt % of tetrabutylphosphonium dodecylbenzene sulfonate.

Example 5

As in Example 1, with a composition comprising 18.0 wt % of Ultem® 1000-1000, 70.0 wt % of Ultem® 1010-1000, 10.7 wt % of titanium dioxide, and 1.3 wt % of tetrabutylphosphonium dodecylbenzene sulfonate. The composition of this Example exhibits a melt volume rate that is 60% higher (45.0 vs. 28.1 cc/10 min) as compared to the composition without tetrabutylphosphonium dodecylbenzene sulfonate (Reference 3), without any appreciable loss of molecular weight, tensile properties or impact strength.

Example 6

As in Example 1, with a composition comprising 20.0 wt % of Ultem® 1000-1000, 79.0 wt % of Ultem® 1010-1000 and 1.0 wt % of 4,4'-oxy-diphthalic anhydride (ODPA).

The composition of this Example exhibits a melt volume rate that is 30% higher (44.2 vs. 33.7 cc/10 min) as compared to the composition without ODPA (Reference 4), and a melt viscosity at 1500 s$^{-1}$ that is 26% lower (307 vs. 416 Pa·s) as compared to the composition in Reference 4, without any appreciable loss of molecular weight, tensile properties, heat or impact strength.

Example 7

As in Example 1, with a composition comprising 95.0 wt % of Ultem® 1000-1000 and 5.0 wt % of the dianhydride compound (R1030 see Equation) is essentially an anhydride-endcapped etherimide oligomer comprising approximately 5 etherimide monomer units with the same molecular structure as the repeating units in Ultem® resin.

R1030 Ultem Oligomer Dianhydride

The composition of this Example exhibits a melt volume rate (MVR) that is 45% higher (25.2 vs. 17.4 cc/10 min) as compared to the composition without the R1030 compound, without any appreciable loss of tensile properties, heat or impact strength.

Example 8

Another typical example of the claimed composition comprises 90.0 wt % of a polyethersulfone resin having a weight-average (virgin) molecular weight of 18,500 grams per mole (g/mol; Ultrason E2010 from BASF) and 10.0 wt % of the dianhydride compound R1030. The composition of this Example exhibits a Melt Volume Rate that is 27% higher (24.7 vs. 19.4 cc/10 min) as compared to the composition without R1030 (Reference 5), without any appreciable loss of molecular weight, tensile properties, heat or impact strength. Melt Volume Rate in this case was determined according to ISO 1133 at 360° C./2.16 kg.

Example 9

As Example 8, with a composition comprising 97.0 wt % of polyethersulfone Ultrason E2010 and 3.0 wt % of tetrabutylphosphonium dodecylbenzene sulfonate. The composition of this Example exhibits a Melt Volume Rate that is 20% higher (23.4 v. 19.4 cc/10 min) as compared to the composition without tetrabutylphosphonium dodecylbenzene sulfonate, without any appreciable loss of molecular weight, tensile properties, heat or impact strength.

Table 1 provides reference examples against which the composition of the present invention is compared. Tables 2 and 3 include the data from Examples 1–9.

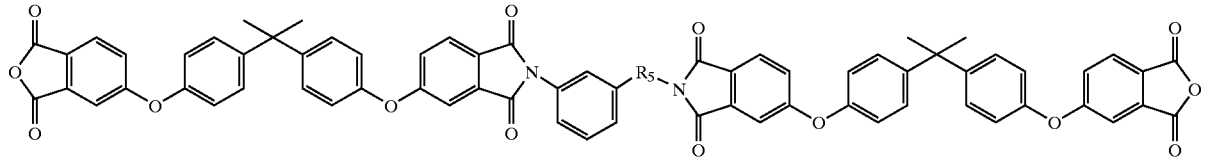

wherein n is 5 and R$_5$ is

TABLE 1

|  | Units | REF(1) | REF (2) | REF (3) | REF (4) | REF (5) |
|---|---|---|---|---|---|---|
| Ultem 1000 | Wt. % | 100.0 | 20.0 | 18.0 | 20.0 |  |
| Ultem 1010 | Wt. % |  | 80.0 | 71.3 | 80.0 |  |
| Ultrason E | Wt. % | 1 |  |  |  | 00.0 |
| $TiO_2$ | Wt. % |  |  | 10.7 |  |  |
| EPA202 | Wt. % |  |  |  |  |  |
| ODPA | Wt. % |  |  |  |  |  |
| Mw | g/mol | 62,700 | 53,000 | 53,300 | 52,300 | 13,200 |
| MVR 360/5 | cc/10 min | 17.4 | 33.2 | 28.1 | 33.7 | 19.4 |
| MV @ 115/S | Pa·s |  | 780 |  | 713 |  |
| MV @ 1500/S | Pa·s |  | 453 |  | 416 |  |
| Tg | °C. | 217 | 216 | 215 | 216 | 224 |
| Vicat B/120 | °C. |  |  |  | 211 |  |
| E-modulus | MPa | 3258 | 3287 | 3620 | 3365 | 2720 |
| Yield Stress | MPa | 114 | 113 | 114 | 115 | 88 |
| EAB | % | 20.0 | 21.2 | 10.3 | 11.0 | 10.0 |
| Izod Notched | $kJ/m^2$ | 5.5 | 5.2 | 5.2 | 5.2 | 6.6 |

TABLE 2

|  | Units | EX(1) | EX (2) | EX (3) | EX (4) | EX (5) |
|---|---|---|---|---|---|---|
| Ultem 100 | wt. % | 97.0 | 98.5 | 20.0 | 20.0 | 18.0 |
| Ultem 1010 | wt. % |  |  | 77.0 | 78.5 | 70.0 |
| $TiO_2$ | wt. % |  |  |  |  | 10.7 |
| EPA202 | wt. % | 3.0 | 1.5 | 3.0 | 1.5 | 1.3 |
| ODPA | wt. % |  |  |  |  |  |
| Mw | g/mol | 62500 | 62400 | 52900 | 52800 | 51100 |
| MVR360/5 | cc/10 min | 27.4 | 23.0 | 43.0 | 39.6 | 45.0 |
| MV @ 115/S | Pa·s |  |  | 530 | 617 |  |
| MV @ 1500/S | Pa·s |  |  | 323 | 362 |  |
| Tg | °C. | 205 | 209 | 205 | 208 | 209 |
| E-modulus | MPa | 3248 | 3280 | 3255 | 3254 | 3556 |
| Yield Stress | MPa | 114 | 114 | 113 | 114 | 106 |
| EAB | % | 17.0 | 14.5 | 18.6 | 26.8 | 13.9 |
| Izod Notched | $kJ/m^2$ | 5.3 | 5.3 | 4.8 | 4.9 | 5.3 |

TABLE 3

|  | Units | EX(6) | EX (7) | EX(8) | EX(9) |
|---|---|---|---|---|---|
| Ultem 1000 | wt. % | 20.0 | 95.0 |  |  |
| Ultem 1010 | wt. % | 79.0 |  |  |  |
| Ultrason E | wt. % |  |  | 90.0 | 97.0 |
| $TiO^2$ | wt. % |  |  |  |  |
| EPA202 | wt. % |  |  |  | 3.0 |
| ODPA | wt. % | 1.0 |  |  |  |
| R1030 | wt. % |  | 5.0 | 10.0 |  |
| Mw | g/mol | 51500 | 54300 | 14300 | 13800 |
| MVR360/5 | cc/10 min. | 44.2 | 25.2 | 24.7* | 23.4* |
| MV @ 115/S | Pa·s | 427 |  |  |  |
| MV @ 1500/S | Pa·s | 307 |  |  |  |
| Tg | °C. | 210 | 214 | 221 | 214 |
| Vicat B/120 | °C. | 208 |  |  |  |
| E-modulus | MPa | 3375 | 3300 | 2841 | 2770 |
| Yield Stress | MPa | 116 | 115 | 93 | 92 |
| EAB | % | 6.0 | 8.0 | 6.0 | 25.6 |
| Izod Notched | $kJ/m^2$ | 5.0 | 5.3 | 5.2 | 5.8 |

*MVR measured at 360° C./2.16 kg

The above examples demonstrate the improved melt flow of high performance (heat resistant) thermoplastic polymers that have phosphonium sulfonate or an anhydride component. No significant loss of molecular weight, tensile properties, heat resistance, or impact strength occurs with the addition of the phosphonium sulfonate or anhydride. One particular advantage of the phosphonium sulfonates and anhydride components described in this invention is that they exhibit a sufficiently high thermal stability so that they can be processed at the high melt temperatures that are generally required to process the heat resistant polymers described herein. Thus, compositions containing said additives do not suffer from processing problems such as juicing, bleeching, plate-out, mold deposits, splay, delamination and surface defects or discoloration in the finished product.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A thermoplastic resin composition comprising a mixture, based on the total weight of the composition, of.
   (A) about 88 wt % to about 99 wt % of a thermoplastic polymer resin selected from the group consisting of polyketones, poly(ether ether ketones), poly(ether ketones) and combinations thereof; and
   (B) about 1 wt % to about 12 wt % of an aromatic diaubydride wherein the composition has a melt volume rate higher than that of the thermoplastic polymer resin.

2. The composition of claim 1, wherein said aromatic dianhydride is selected from the group consisting of

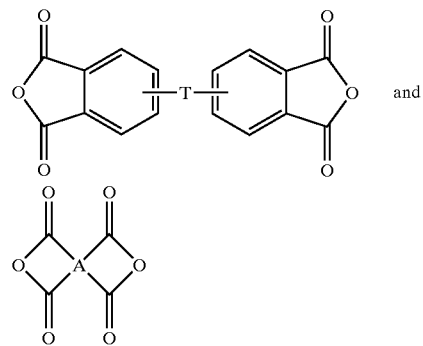

and wherein the divalent T moiety bridges the 3,3', 3,4', 4,3',or 4,4' positions of the aryl rings of the respective aryl anhydride and said T is —O—, —CO—, —$SO_2$—, —S—, —$C_yH_{2y}$— group or a group of the Formula —O—Z—O—; wherein A is a divalent aromatic radical selected from the group consisting of 1,2,4,5-phenylene, 2,3,6,7-naphthalene, or mixtures thereof; and wherein Z is a divalent radical of Formula V

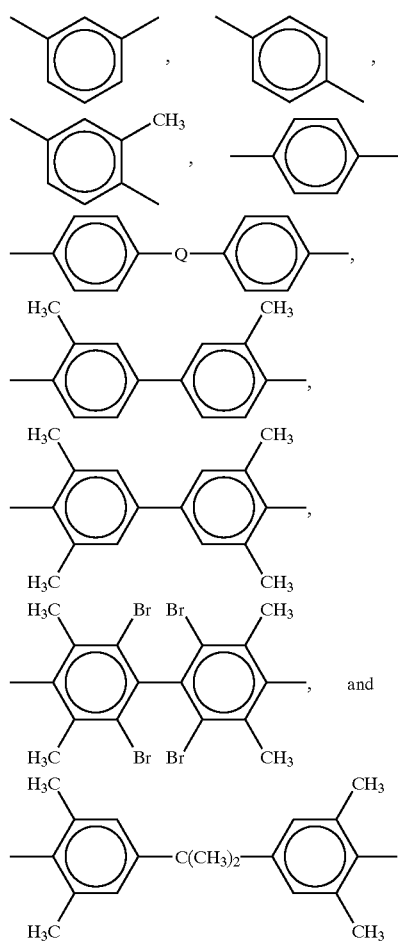

(V)

3. The composition of claim 1, further comprising at least one member of the group consisting of glass fibers, carbon fibers, carbon fibrils, ceramics, clays, talcs, micas, barium sulfate, titanium dioxide, wollastonites, zinc oxides, and combinations thereof.

4. The composition of claim 1, further comprising one member selected from the group of flame-retardants, impact modifiers, crystallization nucleators, dyes, pigments, stabilizers, anti-oxidants, mold release agents and combinations thereof.

5. The composition of claim 1, wherein the thermoplastic polymer resin has a softening point of about 180° C.

6. The composition resin composition of claim 1, further comprising about 93 wt % to about 99 wt % of the thermoplastic polymer(s) resin and about 1 wt % to about 7 wt % of said anhydride, and mixture thereof.

7. An article formed from the composition of claim 1.

8. A thermoplastic resin composition comprising the reaction product, based on the total weight of the composition, of:
   a) about 88 wt % to about 99 wt % of a thermoplastic polymer resin selected from the group consisting of poly(ether ketones), polyketones, poly(ether ether ketones) and combinations thereof; and
   b) about 1 wt % to about 12 wt % of an aromatic dianhydride.

9. The composition of claim 8, further comprising about 93 wt % to about 99 wt % of the thermoplastic polymer resin and about 1 wt % to about 7 wt % of said phosphonium sulfonate, said aromatic dianhydride, or mixtures thereof.

10. The composition of claim 8, wherein said aromatic dianhydride is selected from the group consisting of

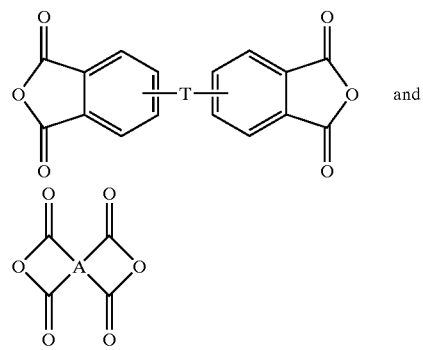

wherein the divalent T moiety bridges the 3,3', 3,4', 4,3', or 4,4' positions of the aryl rings of the respective aryl anhydride and said T is —O—, —CO—, —SO$_2$—, —S—, —C$_y$H$_{2y}$— group or a group of the Formula —O—Z—O—; wherein A is a divalent aromatic radical selected from the group consisting of 1,2,4,5-phenylene, 2,3,6,7-naphthalene, or mixtures thereof; and wherein Z is a divalent radical of Formula V

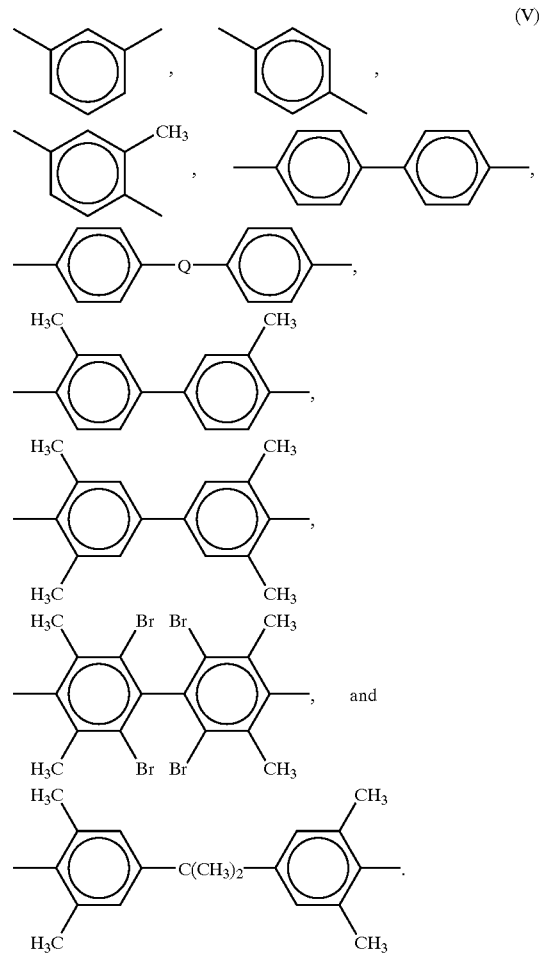

(V)

* * * * *